S. Q. HARPER.
GUANO DISTRIBUTER.
APPLICATION FILED MAR. 3, 1913.
1,116,270.
Patented Nov. 3, 1914.
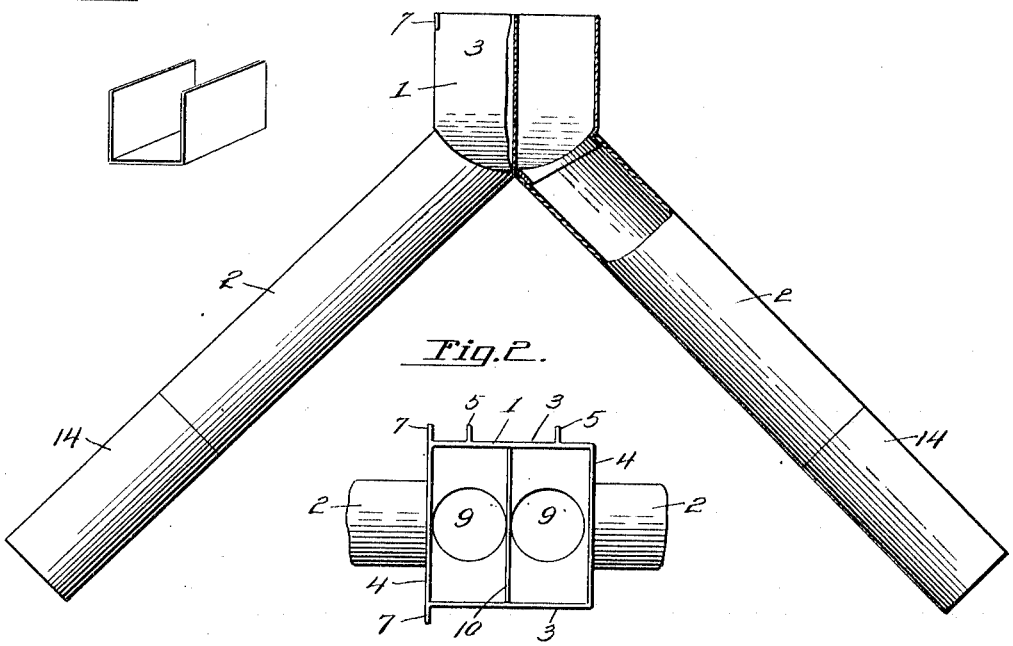
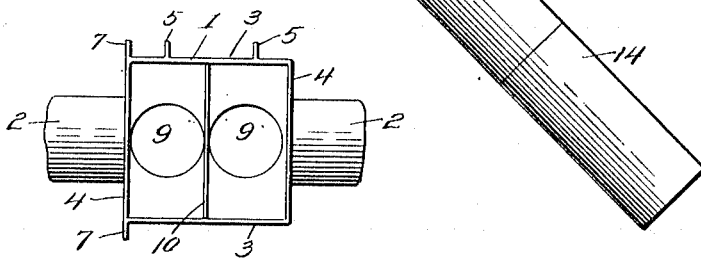
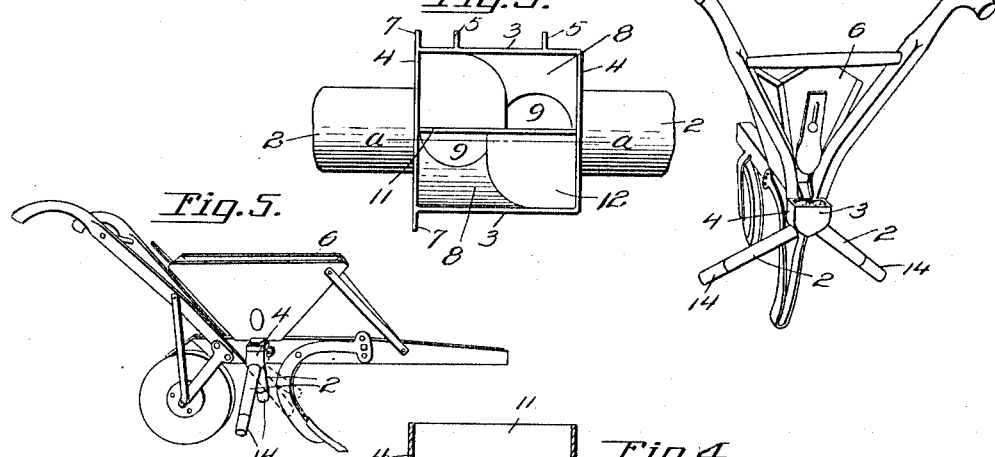
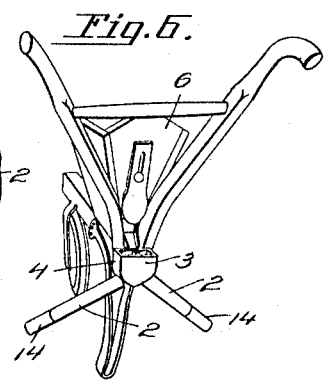
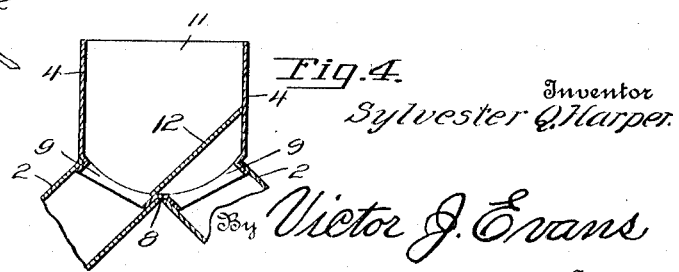
Inventor
Sylvester Q. Harper
By Victor J. Evans
Attorney
Witnesses
F. C. Gibson
J. W. Garner

UNITED STATES PATENT OFFICE.

SYLVESTER QUIGG HARPER, OF FAYETTEVILLE, GEORGIA.

GUANO-DISTRIBUTER.

1,116,270.     Specification of Letters Patent.     Patented Nov. 3, 1914.

Application filed March 3, 1913. Serial No. 751,925.

*To all whom it may concern:*

Be it known that I, SYLVESTER QUIGG HARPER, a citizen of the United States, residing at Fayetteville, in the county of Fayette and State of Georgia, have invented a new and useful Guano-Distributer, of which the following is a specification.

This invention is an improved attachment for fertilizer distributers adapted to be used in connection with fertilizer distributing plows of usual form for applying fertilizer to two rows of growing plants simultaneously, the object of the invention being to provide an improved attachment of this character which is cheap and simple, is strong and durable and is not likely to get out of order.

The invention consists in the construction, combination and arrangement of devices hereinafter described and claimed.

In the accompanying drawings: Figure 1 is partly an elevation and partly a vertical sectional view of a fertilizer distributing attachment constructed in accordance with my invention. Fig. 2 is a detail plan of the same. Fig. 3 is a detail plan of a modified construction of my improved distributer attachment. Fig. 4 is a detail sectional view of the same on the plane indicated by the line *a—a* of Fig. 3. Fig. 5 is an elevation of a plow fertilizer distributing machine provided with a distributing attachment constructed in accordance with my invention. Fig. 6 is a rear elevation of another form of plow distributing machine and provided with my improved distributing attachment. Fig. 7 is a detail perspective view of a wind shield for use over the receiving box of my improved attachment to keep the wind from blowing away the fertilizer.

My fertilizer distributing attachment comprises a receiving box or head 1 and a pair of inclined oppositely extending ends and distributing tubes 2. The head is rectangular in form and may be made of sheet metal or other suitable material and is provided with vertical walls 3 arranged opposite each other and vertical walls 4 between said walls 3. One wall 3 is provided with a pair of spaced lugs 5 adapted to engage opposite sides of the beam of a fertilizer distributing plow such as shown in Fig. 6, in which the fertilizer is discharged from an opening in the rear side and at the bottom of the hopper 6. One wall 4 is also provided at its upper corners with oppositely extending lugs 7 by means of which the attachment may be secured to the one side of the beam of a fertilizer distributing plow or another form, such as indicated in Fig. 5. The bottom of the receiving box 1 is formed by inclined downwardly converging walls 8 each of which has an opening 9 communicating with the upper end of one of the tubes 2. A vertically arranged partition wall 10 is provided which may be secured between the walls 3 and to pass the openings 9 each shown in Fig. 2, when the attachment is for use on a distributing plow such as shown in Fig. 6.

When the attachment is for use with a distributing plow such as shown in Fig. 5 a dividing plate or wall 11 is employed in lieu of the wall 10 and which is arranged between the walls 4 and is triangular in form so that its lower edges fit on the inclined bottom walls 8. This dividing wall 11 has oppositely extending and inclined supporting wings 12 which bear on the inclined bottom walls 4. It will be understood that partition walls 10 or 11 as the case may be will divide the fertilizer supplied to the receiving box and cause it to be evenly distributed to the tubes 2. Said tubes discharge the fertilizer at their outer lower ends on the earth at the two rows of plants between which the fertilizer distributer is run.

My attachment is provided with telescopically related members 14 on the tubes 2 by means of which the length of the tubes may be varied and according to the width of the space between the rows. The shield shown in Fig. 7 may be arranged over the receiving box to prevent the wind from blowing away the fertilizer.

Having thus described my invention, I claim:—

A fertilizer distributer attachment of the class described comprising a receiving box having inclined oppositely arranged downwardly converging bottom walls each provided with an opening and with an inclined distributing tube leading from said opening, and a dividing wall or plate for arrangement between said opposite walls of the receiving box and also between said openings said dividing wall or plate having oppositely extending and oppositely inclined wings to bear on said oppositely inclined bottom walls.

SYLVESTER QUIGG HARPER.

Witnesses:
R. H. BENNETT,
H. M. STEEL.